No. 700,076. Patented May 13, 1902.
J. PATTEN.
LIVE WOOD WALL FOR LEVEES, &c.
(Application filed Mar. 16, 1898.)
(No Model.) 5 Sheets—Sheet I.
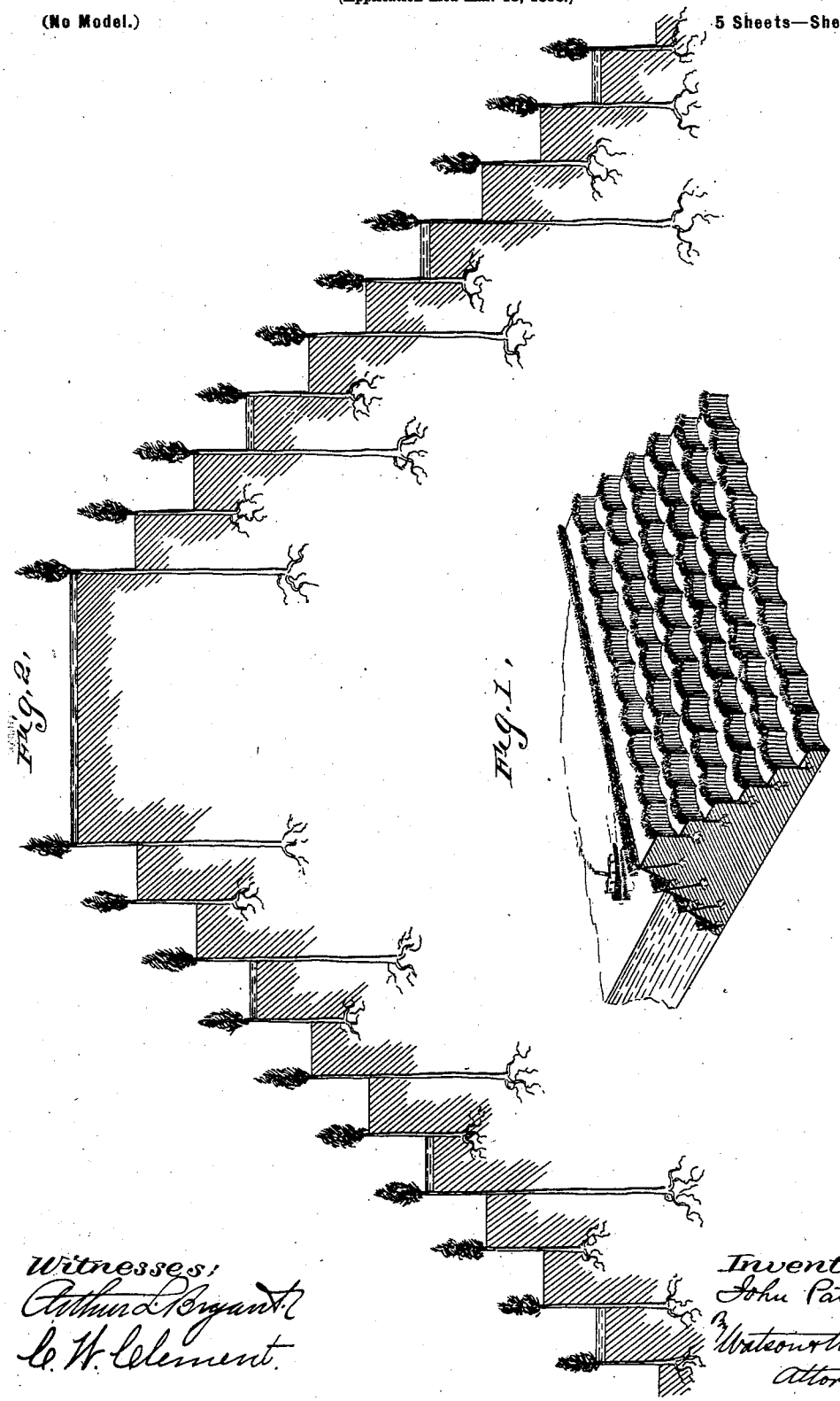

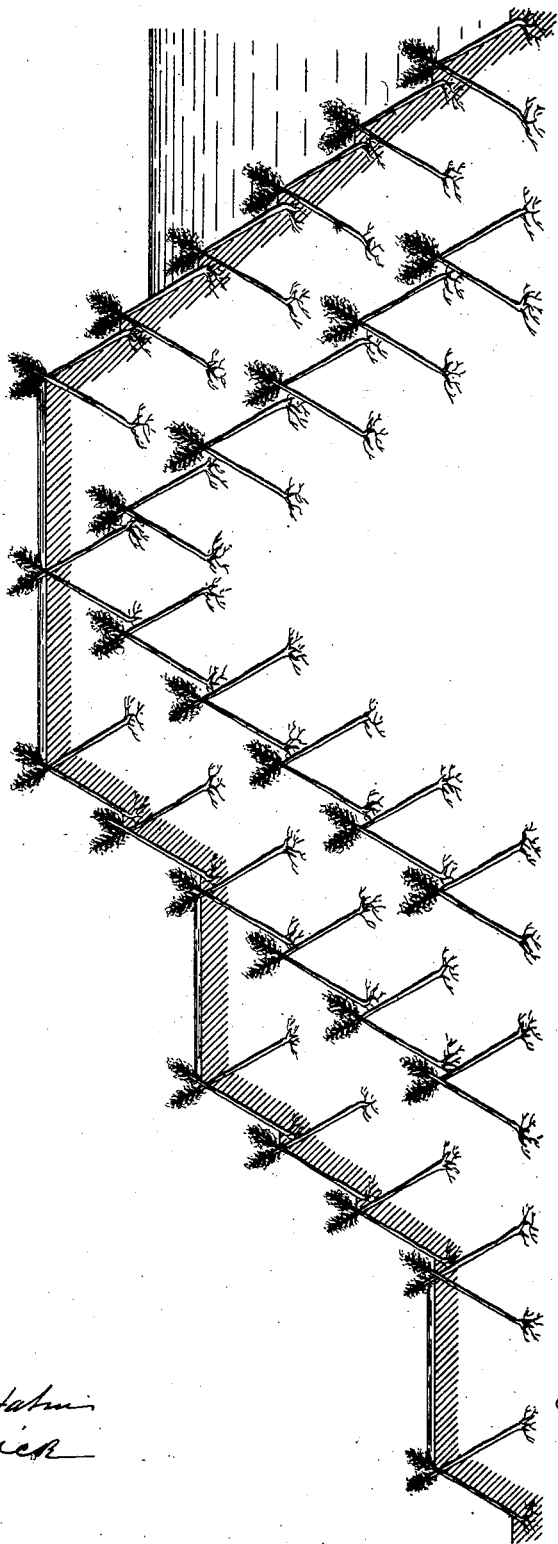

No. 700,076. Patented May 13, 1902.
J. PATTEN.
LIVE WOOD WALL FOR LEVEES, &c.
(Application filed Mar. 18, 1898.)
(No Model.) 5 Sheets—Sheet 3.
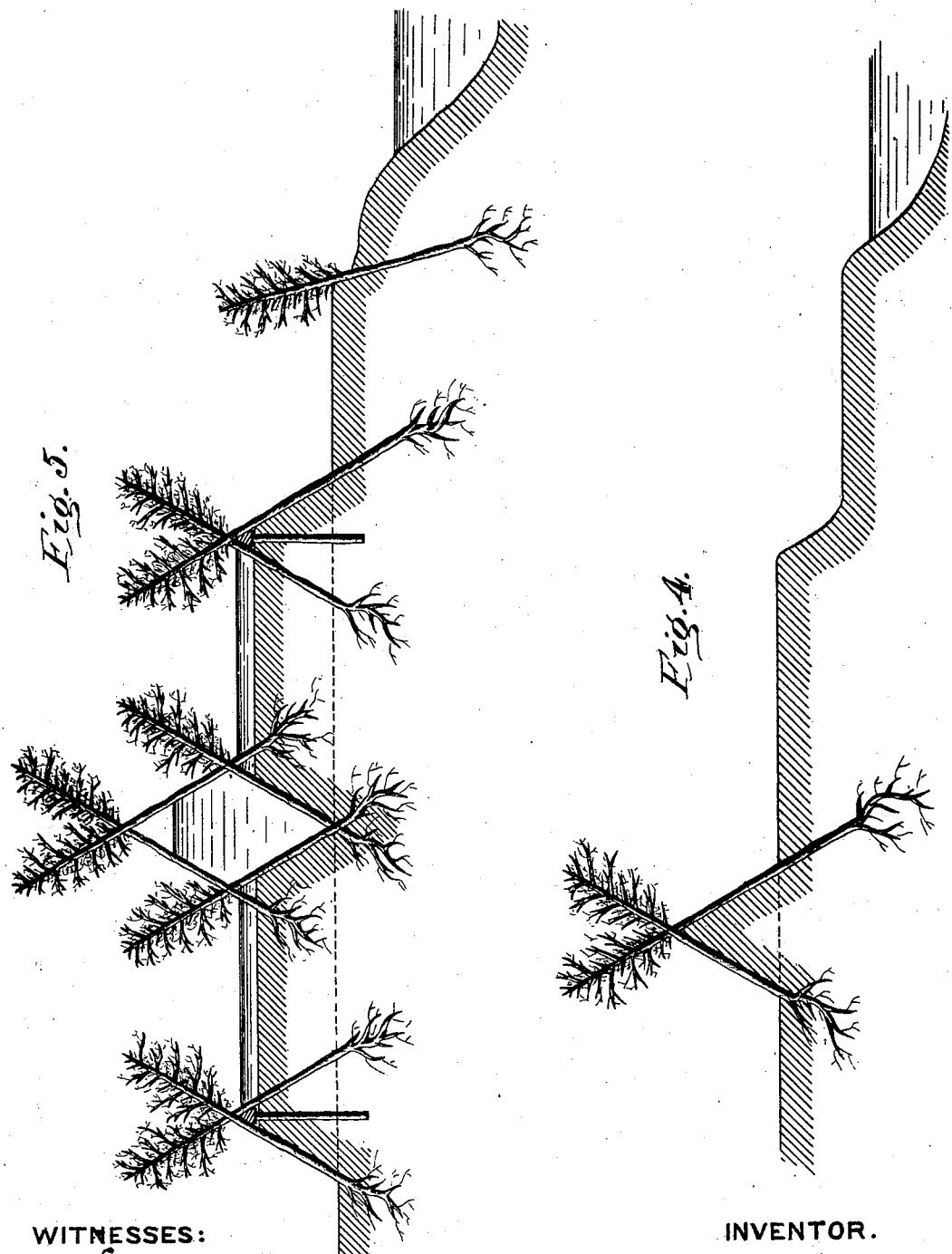
WITNESSES:
INVENTOR.
John Patten.

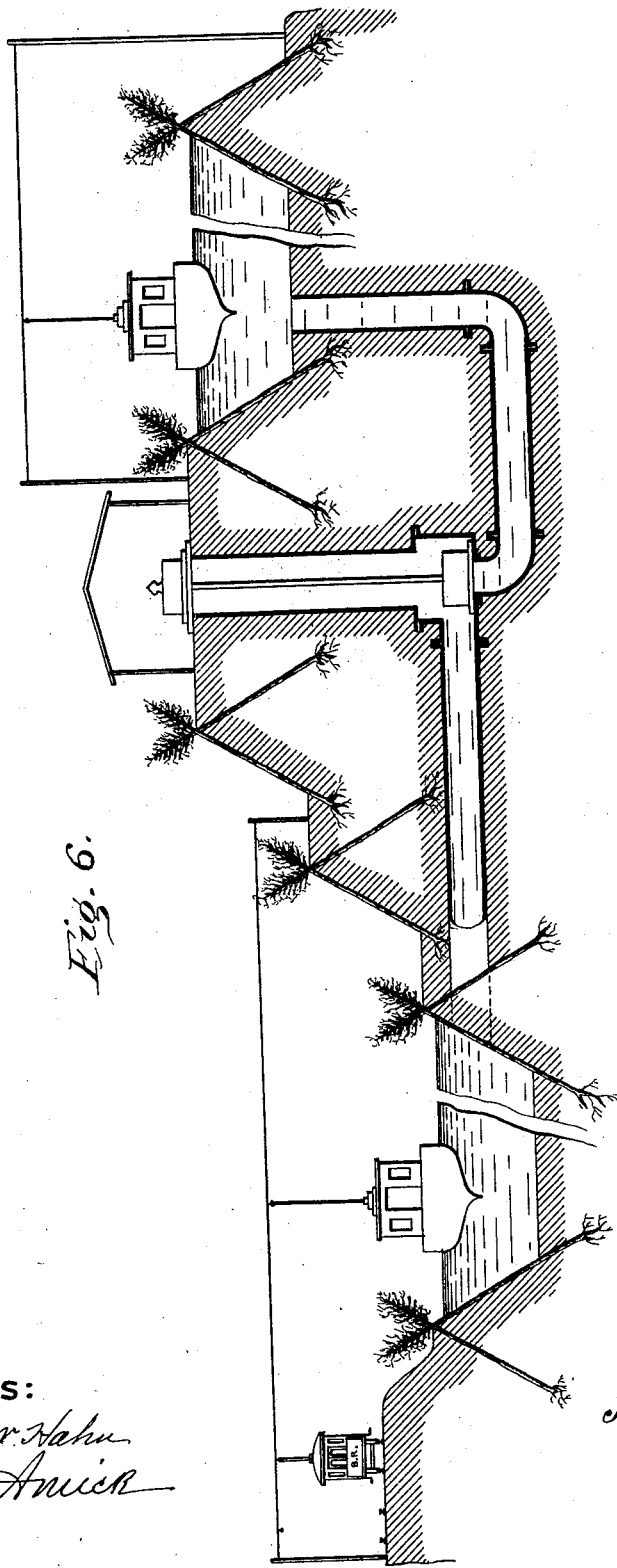

No. 700,076. Patented May 13, 1902.
J. PATTEN.
LIVE WOOD WALL FOR LEVEES, &c.
(Application filed Mar. 18, 1898.)
(No Model.)
5 Sheets—Sheet 5.

WITNESSES:
Harry N. Hahn
Myron J. Amick

INVENTOR.
John Patten.

UNITED STATES PATENT OFFICE.

JOHN PATTEN, OF NEW YORK, N. Y.

LIVE-WOOD WALL FOR LEVEES, &c.

SPECIFICATION forming part of Letters Patent No. 700,076, dated May 13, 1902.

Application filed March 18, 1898. Serial No. 674,323. (No model.)

*To all whom it may concern:*

Be it known that I, JOHN PATTEN, a citizen of the United States, and a resident of New York, in the county of New York and State of New York, have invented a certain new and useful Invention Relating to Live-Wood Walls for Levees, Water-Pipes, and other Purposes, of which the following is a specification.

My invention relates to a method of forming live-wood walls in various forms; and it consists of fastening together and planting a large number of live trees in such a way that they will grow together, forming a live-wood wall or walls of such form as was designed and controlled by the shape of the assembled trees when planted.

The principal use of the live-wood walls formed by carrying out my invention will be for forming retaining-walls for embankments and other purposes, as more fully described in the following specification, in which—

Figure 7:
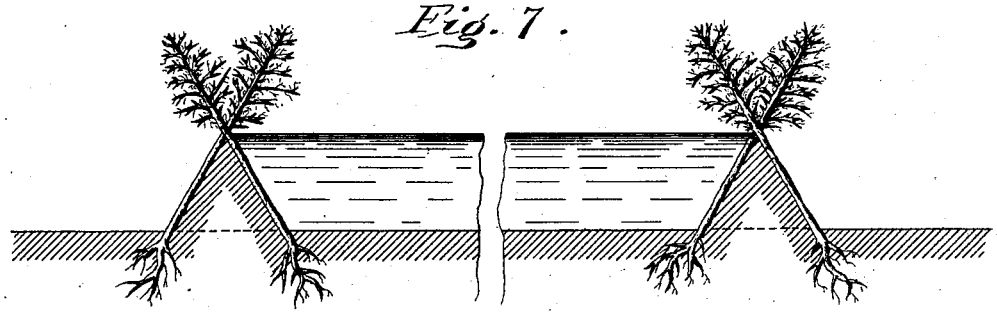
Figure 8:
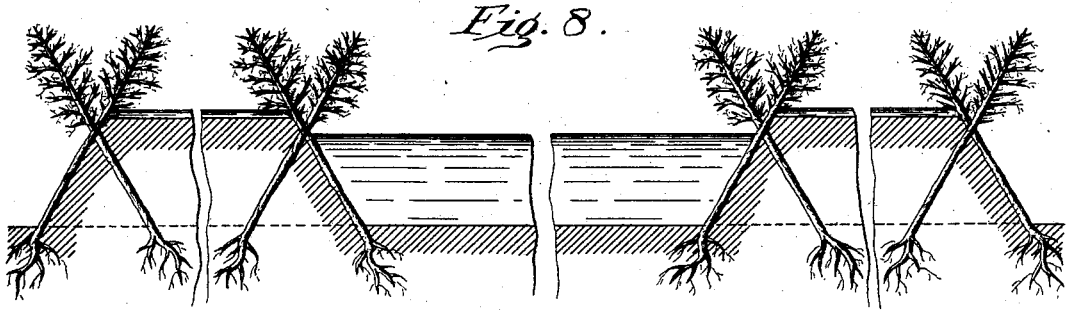

Figure 1 is a perspective view of an embankment formed by carrying out my invention. Fig. 2 is a vertical sectional view of a large embankment formed by depositing sediment or earth between live-wood retaining-walls. Fig. 3 is a vertical sectional view of a large embankment formed of live-wood retaining-walls, earth, and sediment in process of enlargement, the different tiers of the live-wood walls being arranged so as to form a continuous external wall, which is braced by anchor-trees extending into the embankment. Fig. 4 is a vertical sectional view of a live-wood wall-embankment formed from trees assembled X shape, which grow together, forming a double live-wood wall united above the ground and earth filled in between them. Fig. 5 is a more complete embankment formed by two X-shaped live-wood walls with the space between them filled in with sediment. This embankment is furthermore provided with a large pipe formed by live-wood walls, which after they have grown to the required thickness will eventually be covered over in the embankment. This view also shows the lower bank of the river protected by a single live-wood wall, which may sometimes be overflowed, depending upon the large embankment to keep the high waters within bounds. Fig. 6 is a vertical sectional view of a system of live-wood-wall levees providing for a high and low level watercourse, one or both of which may be navigable and provided with a system of propelling boats by power developed from the water descending from the higher to the lower course. Fig. 7 is a sectional view of an elevated canal formed by two X-shaped live-wood embankments. Fig. 8 is a sectional view of a more substantial elevated canal, each bank of which is composed of two sets of X-shaped live-wood walls, earth or sediment being filled in between them.

In carrying out my invention any tree, shrub, or vine (or any long-lived wood plant) can be used which will grow in the desired form of the proposed live-wood wall in the soil, moisture, and climate, and I consider the use of any particular species an equivalent for the others, which are too numerous to mention separately. Usually I will prefer to use hardy rapidly-growing trees, which will readily take root when planted, especially those trees which can be propagated from cuttings.

In carrying out my invention I prefer to use young saplings, raised either from seeds or cuttings and which have previously taken root, so that they will more readily grow after being transplanted and assembled in position to form a live-wood wall.

In forming embankments where the earth is filled in from sediment from running water willows are very good trees to use on account of their rapid growth and the ease with which they can be raised, transplanted, and propagated, and they are so vigorous that they will get plenty of nourishment and grow rapidly when planted in rows close together to form a live-wood wall, and their roots permeate the sediment deposited around them so thickly that the sediment will be more difficult to wash away in the event of an overflow.

There are so many trees that can be used in the various modifications herein shown of my invention that I will not describe their relative advantages here.

No matter what kind of trees are used in carrying out my invention they will generally be raised to a certain size as independent trees, stems, or limbs in the usual way. Then in using those species which are easily propagated from cuttings the trees, stems, or limbs will be cut off above the ground, so other stems, trees, or branches may grow from the same roots, while those that are cut off for use will be trimmed, joined, assembled, and planted. Sometimes the cuttings will be planted one season ahead of the time at which they are to be used as part of the live-wood wall in order that their growth may be started under more favorable conditions. In joining and assembling the trees I avoid as much as possible interfering with the bark of the trees. However, the bark is sometimes removed and the wood cut into where the trees join each other, care being taken to dress any wounds not covered by the adjoining trees. I preferably fasten the trees together by rods, bolts, screws, nails, dowels, or other fastening by having them penetrate into the wood of the trees at the places where they join. The trees may be notched and fitted into each other where they cross until their bodies come in contact or almost touch each other, so it will not take too long a time for them to join and form a tight live-wood wall.

When it is necessary to close the space between the trees up without waiting for the growth of the trees to do it, a strip of dead material inserted in the space between the trees and fastened in place by being mortised, grooved, nailed, or fastened in any suitable way and the expansion of the trees by growth will soon press against the inserted piece so tightly that it will make a tight joint. Then as the live trees increase in size they will grow around the inserted dead material and eventually join together and the inserted dead material will be housed in a live-wood wall. Sometimes instead of inserting dead material I will interpose live trees. Both the main trees and the inserted ones will be trimmed and joined together on the contact sides, the inserted tree being cut off where it abuts against the crossing tree. The trees will be grafted together and grow as a live-wood wall. The intervening tree will have its large end planted in contact with ground, so it can take root and branches can grow from its sides.

I will sometimes fill the space between the trees with asphaltum or some other moderately-soft material, which will make it tight, preventing the escape of water and at the same time be soft enough to yield to the expansion of the trees as they increase in size by their natural growth until they join together, forming a live-wood wall, having forced the soft material out.

I prefer joining the trees together by inserting the fasteners in the wood of the tree at the place of contact to holding the trees together by an external frame, because the latter would interfere with the flow of the sap under the bark and interfere with the deposition of a layer of wood there each year, as is done under the bark on other parts of the trees while they are growing. Consequently it is objectionable to have the outside of the trees or live-wood walls come in contact with anything rigid enough to hold them in position. In building large embankments two or more small live-wood-wall embankments will be first constructed on the site of the proposed large one. These first-constructed live-wood walls will usually be constructed on the margin of the proposed large one and will sometimes be reinforced by the small embankment of earth thrown up against them. Sometimes straw or other material will be thrown against the trees, forming the live-wood wall for the earth to lie against—that is, when the trees are young. Eventually these first-constructed live-wood walls will become a part of the permanent embankment, which will usually be built up by the deposition of sediment from muddy water, which is run in the inclosures between the live-wood walls. Muddy water is obtained from a natural source when available; but sometimes it will be pumped from the river and sometimes earth will be deposited between the trees in the usual way that earth embankments are formed. As the space between the live-wood walls is filled with sediment, a temporary embankment can be thrown against the trees planted to form a live-wood wall, so they will retain the water before they have entirely grown together and after the sediment has raised to the height of a terrace supported by a live-wood retaining-wall, as shown in Figs. 2 and 3. Another live-wood retaining-wall will be constructed on the sediment and another terrace built up in the same way, and so on until the embankment is built up to the required height. The live-wood walls in the meantime will be left growing, increasing in strength and thickness all the time, and the embankment will continue to be enlarged by the deposition of sediment from the water run over the terraces to irrigate the live-wood walls. When it is necessary to increase the width and height of a previously-constructed embankment, it can be accomplished in the manner illustrated in Fig. 3, where the terraces on the left of the embankment are in process of enlargement, a live-wood-wall levee being constructed on one side of the older embankment and the space between them filled in with sediment from running water, or earth can be filled in between in the usual way, and this operation is repeated until the embankment has received the required enlargement.

I sometimes weave or braid the young saplings together and fasten their upper crossings to prevent them from chafing or getting out of place. Then when they grow together, forming a live-wood wall, the wood fibers will be interwoven in such a manner as to materially strengthen the wall.

Sometimes instead of only having a small levee on each side of the proposed embankment when it is to be very wide and long several lines of live-wood walls will be planted and the muddy water alternately introduced between them, so while the sediment is being deposited between one set of walls the other set can be used for agricultural purposes, and vice versa, the sediment forming a rich soil, which will not have to be fertilized, and when it is necessary to irrigate the tract under cultivation it can be done in the usual ways. In this way the great embankments along the entire course of great and long rivers can be constructed while the land on which it is located is still in use, and in most cases the river can be diverted from its natural channel somewhere on high ground and the muddy waters conducted along the site of the embankment, where the sediment will be deposited and the clear water run back into the river; but sometimes in low lands it will be necessary to pump the muddy water upon the levee or its terraces, and sometimes the muddy waters can be obtained at the required elevation from a tributary of the river.

In constructing levees along the bank of rivers that are not subject to great floods sometimes all that is necessary will be the construction of an X-shaped live-wood wall, as in Fig. 4, formed by two rows of trees crossed and fastened together. Earth, straw, &c., can be thrown in between and around the trees, which will eventually as they grow increase in size until they unite, forming a double live-wood wall, making a safe and substantial embankment. For more important rivers I propose making the embankments as shown in Fig. 5. First, a single live-wood wall will be planted deep into the soil near the river, which is to prevent the washing away of the banks. The high waters may sometimes overflow this live-wood wall and then the high waters will be held within bounds by the principal embankment, as shown to the left, which is constructed by first building two X-shaped live-wood-wall levees like Fig. 7, and then filling in the space between them by sediment from muddy water. When pure water can be obtained at a sufficient elevation from a tributary and cities are located farther down the river, where they need a water-supply, I will sometimes construct a large live-wood-wall pipe, as shown in Fig. 5, and as they grow they will increase in size until they join together, forming the live-wood walls of a large pipe. After the walls have grown to the required thickness the conduit can be buried in the embankment and act as a large water-pipe. This will make a very desirable water-supply pipe, because there will be no danger of poisoning the water with metallic compounds, and when the live-wood pipe is buried under the sediment and kept full of water the wood will not decay.

In constructing large wood-wall levees along the banks of navigable rivers when a sufficient quantity of water can be obtained from a tributary or from a higher source of the river at a sufficient elevation it will sometimes be desirable to form a large canal on the top of the levees, as shown in Fig. 6, thereby producing a high and low level watercourse, and at the required places power can be developed from the water descending from the high to the low watercourse through water-wheels. I have here shown a water-wheel operating a dynamo, which develops electricity propelling boats by a trolley system on the river or canal. The power of course can be used for other purposes. This system will be so conducted that the muddy water will be admitted onto the live-wood-wall terraces, and after the most of the sediment has settled the clearer water will be allowed to run into one of the watercourses, and by this means embankments on each side will be elevated by the growth of live-wood walls and deposition of the sediment, so the height of the elevated canal will increase with time and form a valuable source of power along the course of the river.

Sometimes in constructing an elevated canal or reservoir above the level of the surrounding land an X-shaped double live-wood wall-embankment, as shown in Fig. 7, will answer. When necessary, straw can be thrown against the side of the trees and covered with earth, which will make the embankment hold water moderately well until the trees grow together, forming a substantially live-wood wall-embankment. When it is necessary to form a more substantial embankment, a double set of live-wood walls, with earth or sediment filled in between, can be used, as shown in Fig. 8.

Sometimes bark may intervene between the trees and they may tightly press against each other, forming a tight joint without joining. This is not very objectionable and still forms the object of my invention. As the trees are fastened and held together in other places, so the places where the trees press together form a tight joint, and consequently is virtually a continuation of the live-wood wall of my invention. Sometimes the space between the trees will be closed by inserting a strip of wood, metal, or other material, the edges of which will rest in grooves in the trees, and as the trees grow around the inserted strips they will eventually join, inclosing them in the live-wood walls.

Having thus explained my invention, what I claim as new, and desire to secure by Letters Patent, is—

1. A live-wood wall composed of live trees or other long-lived wood plants which were assembled, fastened together and planted substantially as herein described and for the purposes set forth.

2. A live-wood wall composed of trees (or other long-lived wood plants) which were trimmed or flattened where they were joined before they were assembled, fastened together and planted, substantially as herein shown and for the purposes herein set forth.

3. An X-shaped live-wood wall composed of live trees (or other long-lived plants) which were crossed, assembled X-shaped in a double row, fastened together and planted, substantially as herein described and for the purposes set forth.

4. A live-wood-wall pipe composed of live trees (or other long-lived wood plants) which were trimmed or flattened beneath the bark on the sides where they join before they were assembled, fastened together and planted substantially as described and for the purposes set forth.

5. A live-wood wall composed of live trees (or other wood plants) assembled, fastened together and planted substantially as described, in combination with sediment or earth deposited between or against the live-wood wall to form a levee or embankment, substantially as described and for the purposes set forth.

6. A system of live-wood walls composed of live trees (or other long-lived wood plants) assembled, fastened together and planted substantially as described so as to form retaining-walls for the sides and terraces of levees or embankments, substantially as described and for the purposes set forth.

Signed at New York, in the county of New York and State of New York, this 16th day of March, A. D. 1898.

JOHN PATTEN.

Witnesses:
  M. J. AMICK,
  E. W. PHELPS.